United States Patent [19]

Harano et al.

[11] Patent Number: 4,689,692
[45] Date of Patent: Aug. 25, 1987

[54] OPTICAL READER

[75] Inventors: Tetsuo Harano, Inazawa; Kenji Sakakibara, Ichinomiya, both of Japan

[73] Assignee: Brother Industries, Ltd., Nagoya, Japan

[21] Appl. No.: 799,607

[22] Filed: Nov. 19, 1985

[30] Foreign Application Priority Data

Nov. 20, 1984 [JP] Japan ................. 59-244830

[51] Int. Cl.[4] .............................. H04N 1/04
[52] U.S. Cl. ..................... 358/283; 358/901; 358/285
[58] Field of Search ............... 358/287, 283, 285, 901

[56] References Cited

U.S. PATENT DOCUMENTS 4,593,325  6/1986  Kannapell ................. 358/282

Primary Examiner—Michael A. Masinick
Attorney, Agent, or Firm—Kane, Dalsimer, Kane, Sullivan and Kurucz

[57] ABSTRACT

An optical reader comprises a plurality of light emitting elements which illuminate a plurality of points through a plurality of optical fibers, a plurality of light receiving elements which receive reflected light from the plurality of reading points through a plurality of optical fibers, and read means for reading an image on a paper on the basis of outputs from the light receiving elements. Amounts of light emitted by the individual light emitting elements are established at a plurality of halftones for illumination, thus eliminating the need for a compensation of a reference value to be used with the individual light emitting elements, thus enabling an image to be read in multiple halftones.

5 Claims, 11 Drawing Figures

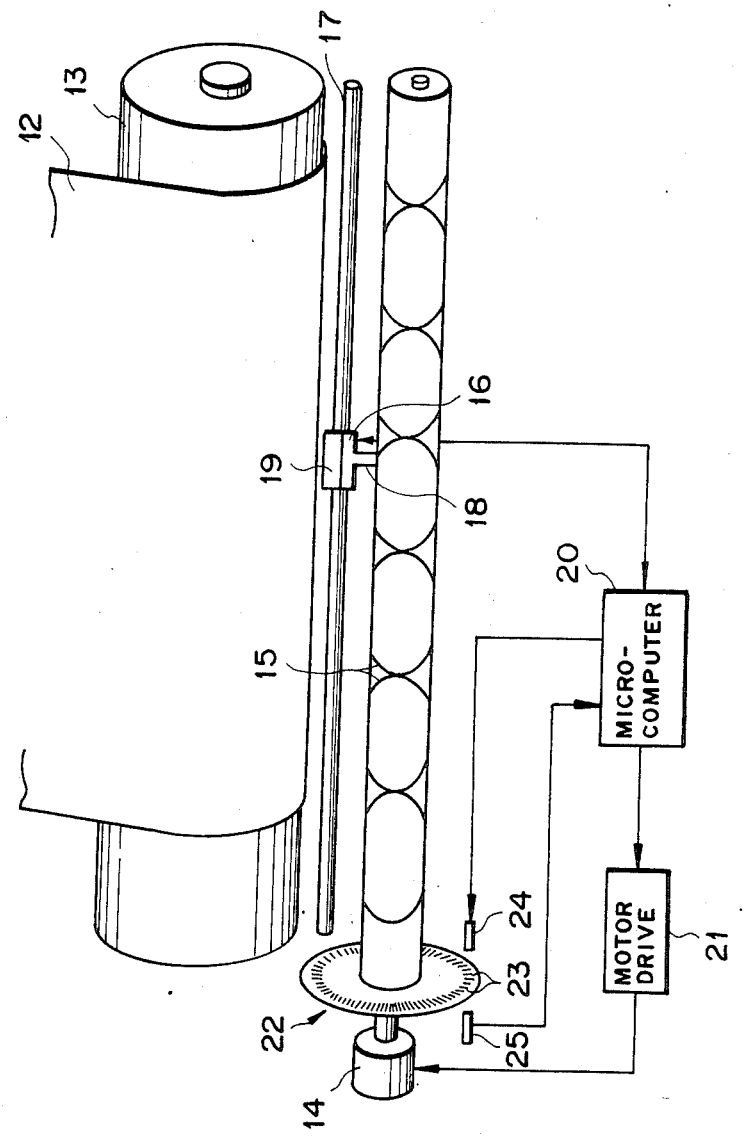

OPTICAL READER

BACKGROUND OF THE INVENTION

The invention relates to an optical reader for reading an image on a document or paper.

A conventional optical reader of this kind comprises a plurality of light emitting elements which illuminate or irradiate a plurality of reading points on a document or paper through a plurality of optical fibers, a plurality of light receiving elements which receive reflected lights from the plurality of points on the paper through a plurality of optical fibers, and read means which reads an image on the paper on the basis of the relative magnitudes of outputs from the plurality of light receiving elements as compared against a single given reference value. Such optical reader reads an image on the paper by determining if a particular image on the paper represents a white or black relative to the single reference value. Accordingly, when an image on the paper is depicted in multiple halftones, the optical reader mentioned above has been incapable of reading the image on the paper in halftones.

Recently, it is desired by users that an optical reader of the kind described be capable of reading an image or images on a paper in multiple halftones. At this end, the read means is supplied with a plurality of reference values. As an image on the paper is read on the basis of a relative magnitude with respect to a greater one of the plurality of reference values, the image read by the read means is determined as representing an intermediate color which is close to the white color. If an image on the paper is read by a comparison against a smaller one of the plurality of reference values, the image read by the read means is determined as an intermediate color which is close to the black color. When an arrangement is made such that such optical reader reads adjacent spots on the paper in the pattern of a dither matrix, for example, using a plurality of reference values, an image on the paper can be read in multiple halftones.

There arises a problem, however, that the plurality of light emitting elements which are contained in the optical reader may have non-uniform light emission due to variation in their operating characteristics or variation due to aging effect. If the plurality of light emitting elements produce an equal amount of light, outputs from the plurality of light receiving elements may still be non-uniform if the connection between the light emitting elements and the associated optical fibers or between the light receiving elements and their associated optical fibers are not perfectly in close adherence. Like the light emitting elements, the light receiving elements may produce non-uniform outputs because of variations in the operating characteristic among them and also due to the aging effect. Accordingly, it becomes necessary that an individual one of the plurality of reference values which are set up in the read means be adjusted to a proper magnitude in accordance with an output value from a particular light receiving element. When the number of reference values which must be adjusted increases, the resulting adjustment is both time and labor consuming operation.

SUMMARY OF THE INVENTION

It is an object of the invention to overcome the problems of the prior art are mentioned above. At this end, it is an object of the invention to provide an optical reader which dispenses with an adjustment of reference values which are set up in read means, and which enables a reading in multiple halftones while using such reference value.

The above objects are accomplished in accordance with the invention by an optical reader comprising a plurality of light emitting elements for illuminating a plurality of reading points on a document or paper through a plurality of optical fibers, a plurality of light receiving elements for receiving reflected light from the individual points on the paper through a plurality of optical fibers, read means for reading an image on the paper based upon the relative magnitudes of outputs from the plurality of light receiving elements with respect to a given reference value, adjust means for adjusting the amount of light emitted from the light emitting element at levels corresponding to a plurality of halftones, and control means for controlling the plurality of light emitting elements so that they illuminate the plurality of reading points with different adjusted amounts of light which correspond to the plurality of halftones.

In the operation of the described optical reader, one of the light emitting elements illuminates one of the plurality of reading points with an adjusted amount of light which corresponds to one of the plurality of halftones, and a different one of the light emitting elements illuminates a different reading points with an amount of light which corresponds to a different one of the halftones. The plurality of light emitting elements receive reflected light from these points and produce output values, which are compared against a single given reference value. In this manner, an image on the paper can be read in multiple halftones on the basis of their relative magnitude with respect to the given reference value.

Above and other objects, features and advantages of the invention will become apparent from the following description of an embodiment thereof with referenece to the drawings.

BRIEF DESCRIPTION OF THE DRAWINGS

FIG. 2 is a perspective view of the embodiment;

DESCRIPTION OF AN EMBODIMENT

Figure 1:
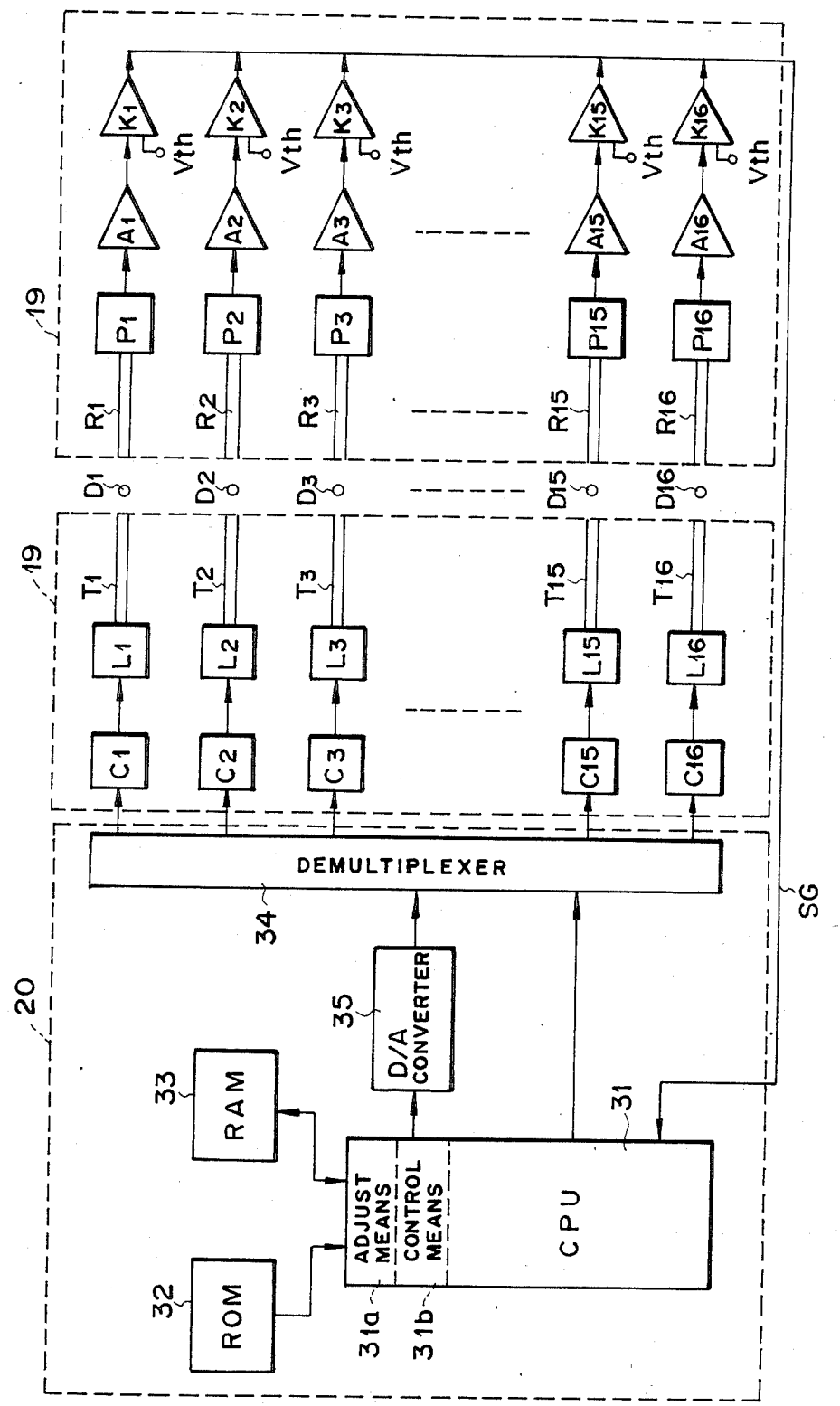
FIG. 1 is a block diagram of one embodiment of the invention.

Initially referring to FIG. 2 which illustrates the appearance of one embodiment of the invention, there is shown a drive shaft 11 which has its opposite end carried by a frame, not shown, of an optical reader. A paper which is to be read is supported around a support drum 13, which controls a feed operation of the paper 12. It will be noted that the drive shaft 11 is disposed in parallel relationship with the drum 13. One end of the drive shaft 11 is operatively connected to a DC motor 14, and a spiral cam groove 15 is formed in the peripheral surface of the shaft. A holder 16, which carries a read head 19, to be described later, is carried by a guide shaft 17 so as to be movable therealong. The guide shaft 17 is also disposed in parallel relationship with the support drum 13 in front of the drive shaft 11. On its rear surface, the holder 16 is formed with a detent 18 which fits in the spiral cam groove 15 so as to be supported thereby. The DC motor 14 is driven by a motor drive circuit 21, which is in turn controlled by a microcomputer 20 including peripheral circuits as will be described later. When the drive shaft 11 is driven for rotation by the motor 14, the holder 16 moves along the guide shaft 17 as a result of the engagement between the detent 18 and the spiral cam groove 15.

The read head 19 is mounted on the front surface of the holder 16 which is located opposite to the support drum 13. A read operation of the head 19 is controlled by the microcomputer 20.

A rotary plate 22 is fixedly mounted on one end of the drive shaft 11 for rotation therewith. A plurality of slits 23 are concentrically formed in the peripheral edge of the rotary plate 22 at a predetermined equal spacing.

A light emitting element 24 is disposed on one side of the rotary plate 22 so as to be located in opposing relationship with the slits 23. A light receiving element 25 is disposed on the other side of the rotary plate so as to be opposite to the light emitting element 24. The light receiving element 25 detects the passage of a slit 23 by receiving light from the light emitting element 24, with a detection signal being fed to the microcomputer 20. On the basis of the detection signal, the microcomputer 20 incrementally moves the read head 19 so as to correspond to a pitch of the reader resolution.

Referring to FIG. 1, the read head 19 and the microcomputer 20 will be described in more detail. The read head 19 includes a first to a sixteenth light emitting element L1 to L16, which are connected to a first to a sixteenth drive circuit C1 to C16, respectively. The light emitting elements L1 to L16 can emit light when signals are fed to the first to the sixteenth drive circuit C1 to C16 from a demultiplexer 34.

The first to the sixteenth light emitting elements L1 to L16 are connected to the first to the sixteenth emission side fibers T1 to T16, respectively. It is to be understood that the ends of the first to the sixteenth fibers T1 to T16 which are located opposite to the paper are aligned with each other in a row which extends perpendicular to the direction of movement of the read head 19. Light emitted by the elements L1 to L16 are transmitted through the fibers T1 to T16 to illuminate individual reading points D1 to D16 located on the paper.

The first to the sixteenth receiving side fibers R1 to R16 have their one end disposed with each other in a raw which extends parallel opposite to the paper 12 and further aligned to the raw of the ends of the emission side fibers T1 to T16, which are also disposed adjacent to the paper 12. It will be seen that the ends of the receiving side fibers R1 to R16 which are disposed opposite to the paper 12 receive reflected light from the individual points D1 to D16.

The other end of each of the first to the sixteen receiving side fibers R1 to R16 is connected to one of a first to a sixteenth light receiving elements P1 to P16, respectively. In this manner, the first to the sixteenth light receiving elements P1 to P16 receive reflected light from the individual points D1 to D16 on the paper through the receiving side fibers R1 to R16. Each of the light receiving elements P1 to P16 translates an amount of light received into a proportional electrical signal, which is fed to one of amplifiers A1 to A16 contained within the read head 19.

The amplifiers A1 to A16 amplify the respective input signals, and output the amplified signals to a plurality of comparators K1 to K16, also contained within the read head 19. Each of the comparators K1 to K16 is supplied with a single reference value Vth, against which output signals from the amplifiers A1 to A16 are compared. When a signal from any one of the amplifier A1 to A16 is greater than the reference value Vth, a corresponding one of the comparators K1 to K16 outputs a high level signal SG, which is fed to a central processing unit (hereafter abbreviated as CPU) 31 which is contained in the microcomputer 20. In a similar manner, when a signal supplied from one of the amplifiers A1 to A16 is less than the reference value Vth, a corresponding one of the comparators K1 to K16 outputs a low level signal SG which is also fed to CPU 31. When the high level signal SG is output, it means that a given point D on the paper has reflected an amount of light which exceeds a given value or that the paper carries an intermediate color close to the white color at that point. When the low level signal SG is output, the point D on the paper reflects an amount of light which is less than the given value or this means that the point exhibits an intermediate color which is close to the black color. Accordingly, the comparators K1 to K16 constitute read means which reads an image on the paper. It will be seen that the read means reads an image on the paper on the basis of output values developed by the plurality of light receiving elements R1 to R16 which are compared against a single given reference value.

Figure 3A:
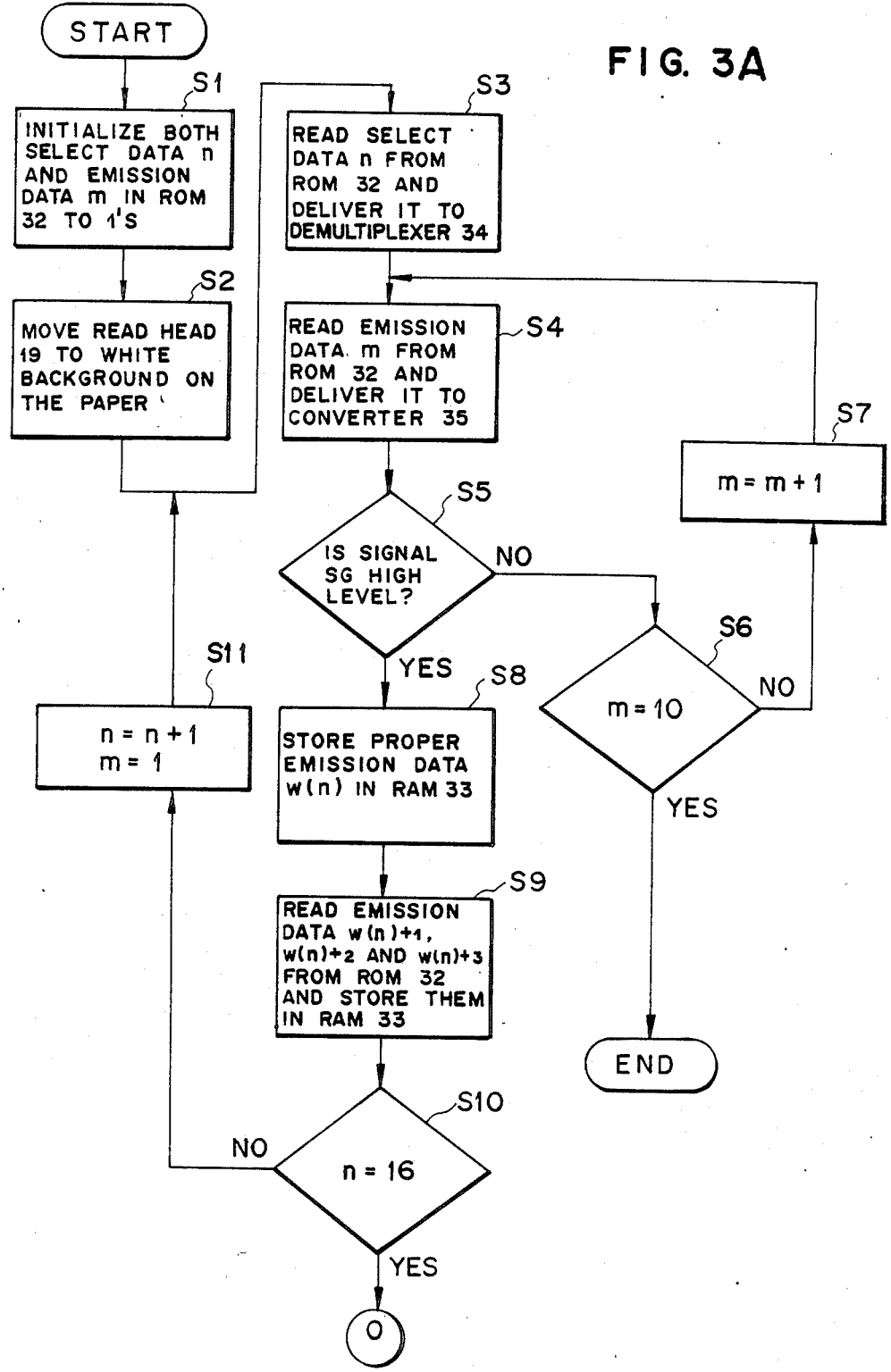
FIGS. 3A, 3B, 3C and 3D show flow charts.
Figure 3B:
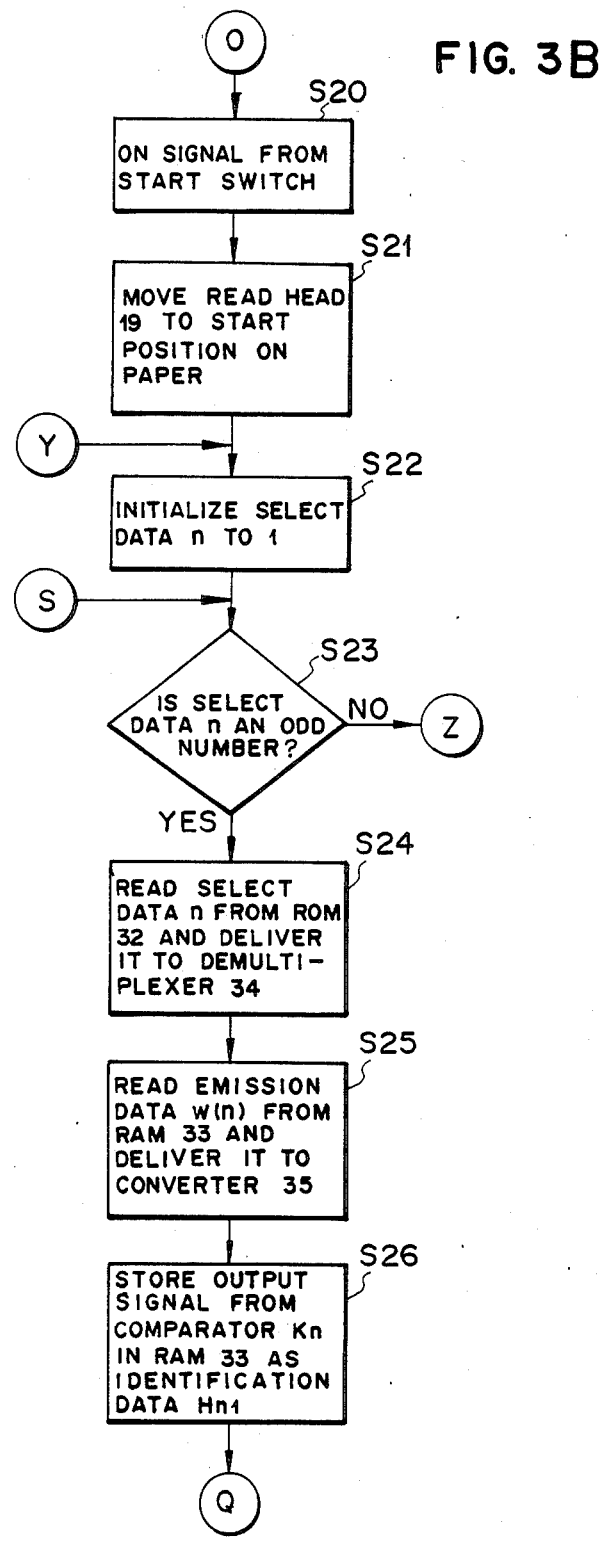
Figure 3C:
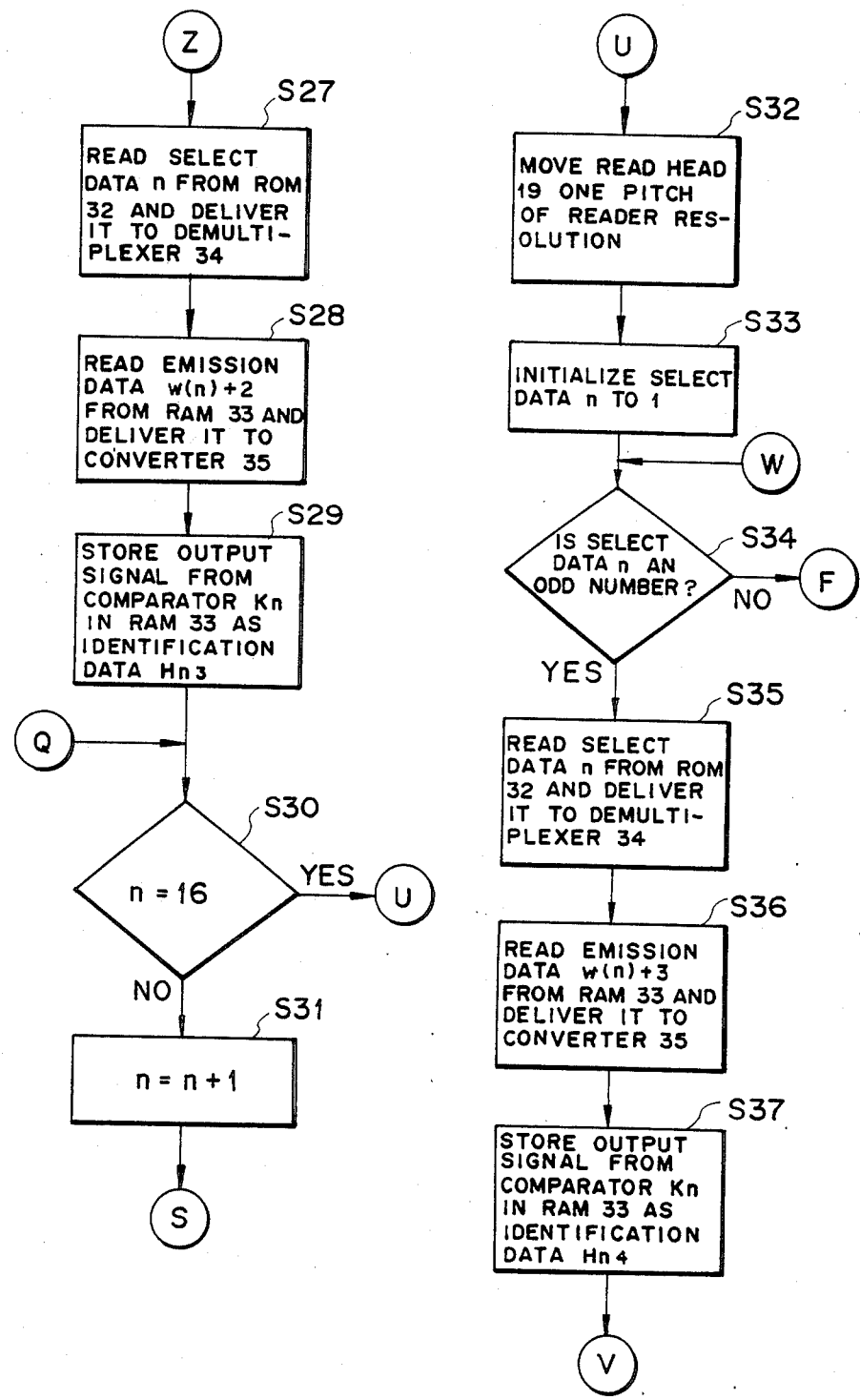
Figure 3D:
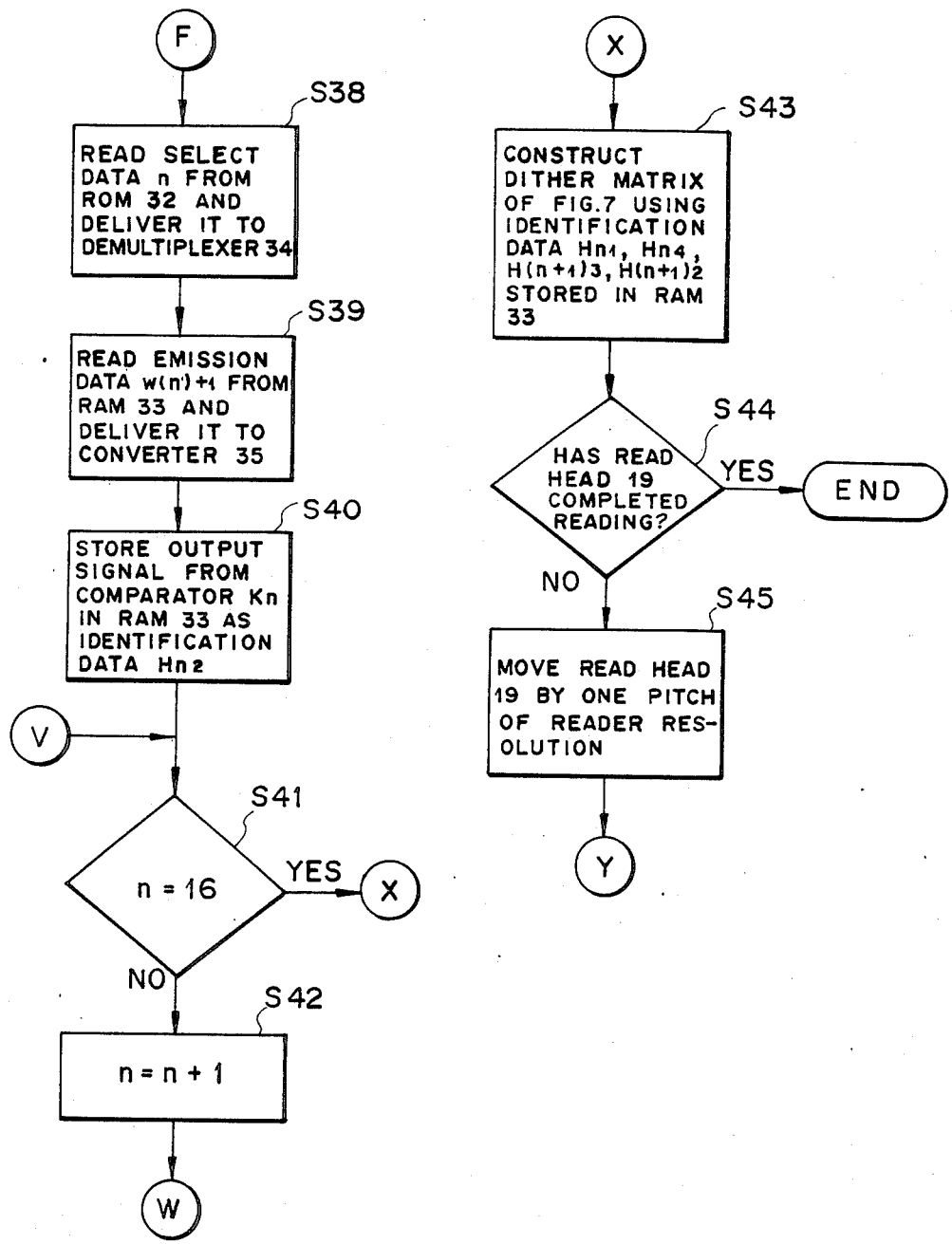

CPU 31 is connected to a read only memory (hereafter abbreviated as ROM) 32 and a read/write memory (hereafter abbreviated as RAM) 33, both contained within the microcomputer 20. CPU 31 operates in a manner to be described later, based on programs and data stored in ROM 32 and data stored in RAM 33. When CPU 31 operates in accordance with a flow chart shown in FIG. 3A, it constitutes adjust means 31a which sets up the amount of light emitted from the light emitting element L1 to L16 in a plurality of halftones. Similarly, when CPU operates in accordance with flow charts shown in FIGS. 3B, 3C and 3D, it constitutes control means 31b which controls the plurality of light emitting elements L1 to L16 to illuminate with different amounts of light corresponding to the plurality of halftones established by the adjust means 31a.

CPU 31 is connected to a demultiplexer 34 which is also contained within the microcomputer 20. The demultiplexer 34 selectively outputs an analog signal, which is output by a D/A converter 35, to the drive circuits C1 to C16. It will be appreciated that the D/A converter 35 converts a digital signal which is output from CPU 31 into a proportional analog signal before it is fed to the demultiplexer 34. One of the drive circuits C1 to C16 which is selected by the demultiplexer 34 applies the analog signal fed from the converter 35 to one of the light emitting elements L1 to L16, causing that light emitting element to emit light in an amount which is proportional to the analog signal applied.

The adjust means 31a will now be described. ROM 32 store data n (hereafter referred to as select data) which is used to select from the first to the sixteenth drive circuits C1 to C16, and also store data m (hereafter referred to as emission data, and can assume one of thirteen values in the present embodiment) which is used to specify the amount of light emission from the light emitting elements L1 to L16. CPU 31 progresses through steps S1 to S11 of the flow chart shown in FIG. 3A.

CPU 31 initializes select data n and emission data m to 1, respectively (step S1). CPU 31 controls the DC motor 14 in accordance with a signal from the light receiving element 25, and moves the read head 19 to a point on the paper which represents the white background (step S2).

CPU 31 then reads select data n=1 from ROM 32 and outputs it to the demultiplexer 34 (step S3). Thereupon, the demultiplexer 34 outputs the analog signal which is output by the converter 35 to the drive circuit C1.

Figure 4:
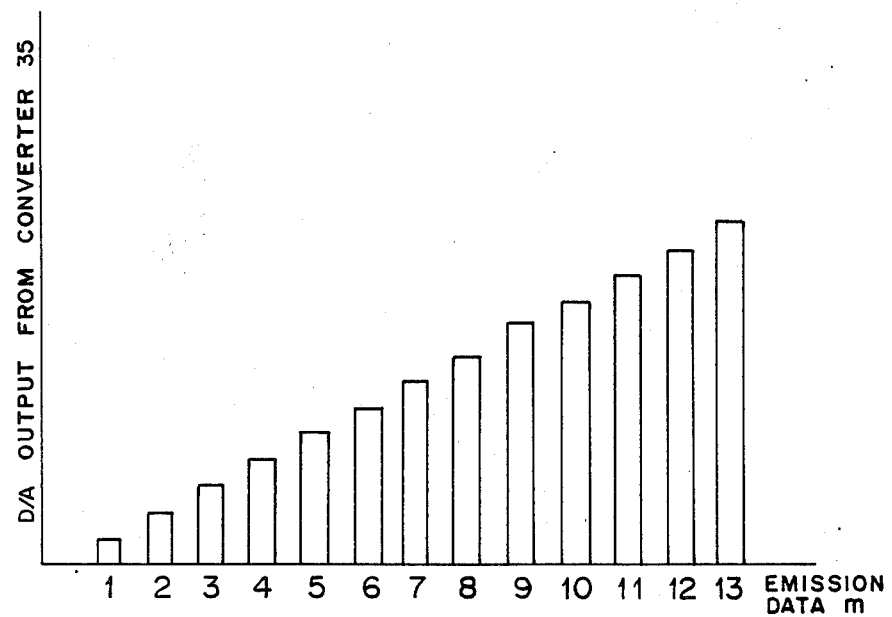
FIG. 4 graphically shows the relationship between an output from D/A converter and light emission data.

CPU 31 then reads emission data m=1 from ROM 32, and outputs it to the converter 35 (step S4). Thereupon, a signal from the converter 35 having an output value corresponding to the emission data m=1, as illustrated in FIG. 4, is applied to the drive circuit C1. The light emitting element L1 emits an amount of light which corresponds to the output value, and such light is transmitted through the emission side fiber T1 to illuminate the point D1. The light receiving element P1 receives reflected light from the point D1 through the receiving side fibers R1, and produces a signal which corresponds to the amount of light received, which signal is fed to the amplifier A1. The amplifier A1 outputs an amplified signal to the comparator K1, which then compares it with the reference value Vth. The comparator K1 then outputs a signal SG which is fed to CPU 31.

CPU 31 determines if the signal SG represents a high level (step S5). If the signal SG represents a low level, CPU 31 then determines if the emission data m is equal to 10 (step S6). If the emission data m is not equal to 10, CPU 31 increments the emission data m to (m+1) (step S7). Thus, the emission data m is now equal to 2, CPU 31 then reads the emission data m=2 from ROM 32, and outputs it to the converter 35 (step S4). The described operation is then repeated, and CPU 31 determines if the resulting signal SG represents a high level (step S5). In this manner, CPU 31 repeats the steps S4, S5, S6 and S7 until the signal SG represents a high level. However, for reasons to be described later, if the signal SG does not represent a high level when the emission data m is equal to 10, CPU 31 then decides that a failure has occurred within the optical reader, and ceases to progress through the steps of the flow chart.

When CPU 31 determines that the signal SG represents a high level, it decides that the emission data m represents an emission data w(n=1) which produces a proper amount of light. CPU 31 then causes the emission data w(1) for the proper amount of light in respect to the light emitting element L1 to be stored in RAM 33 (step S8). On the basis of the emission data w(1) for the proper amount of light, CPU 31 then reads one incremented emission data w(1)+1, two incremented emission data w(1)+2 and three incremented emission data w(1)+3 from ROM 32, and these emission data are stored in RAM 33 (step S9). If w(n) is equal to 10, w(n)+3 is equal to 13.

CPU 31 then determines if the select data n has reached 16 (step S10). If the select data n has not reached 16, CPU 31 increments the select data n to (n+1) (step S11). CPU 31 now reads the select data n=2 from ROM 32, and outputs it to the demultiplexer 34. The demultiplexer 34 then outputs the analog signal which is output by the converter 35 to the drive circuit C2. CPU 31 then repeats the operations of the steps S4 to S7, and causes an emission data w(2) for a proper amount of light in respect to the light emitting element L2 to be stored in RAM 33 (step S8). CPU 31 then reads one incremented data w(2)=1, two incremented data w(2)+2 and three incremented data w(2)+3, and causes these emission data to be stored in RAM 33 (step S9). The emission data w(n), w(n)+1, w(n)+2, and w(n)+3 will be hereafter referred to as "established emission data".

The described operation is repeated until the select data n becomes equal to 16, each time providing established emission data w(n), w(n)+1, w(n)+2, and w(n)+3. As a consequence, the problems mentioned above which relate to the non-uniform emission of light from the light emitting elements L1 to L16 due to variations in the operating characteristics or due to the aging effect and which also relate to the non-uniform output values from the light receiving elements P1 to P16 due to the imperfect or improper connection between the light emitting elements L1 to L16 and the emission side fibers T1 to T16 or between the light receiving elements P1 to P16 and the receiving side fibers R1 to R16 are eliminated. The amount of light from the light emitting elements L1 to L16 are established in four halftones so that the light receiving elements P1 to P16 can always develop output values in four halftones from the same paper.

The control means 31b will now be described. After CPU 31 has progressed through the steps S1 to S11 of the flow chart shown in FIG. 3A, it then transfered to the operations illustrated in steps S20 to S45 of the flow charts shown in FIGS. 3B, 3C and 3D while utilizing the established emission data w(n), w(n)+1, w(n)+2, and w(n)+3 which are stored in RAM 33.

Figure 5A:
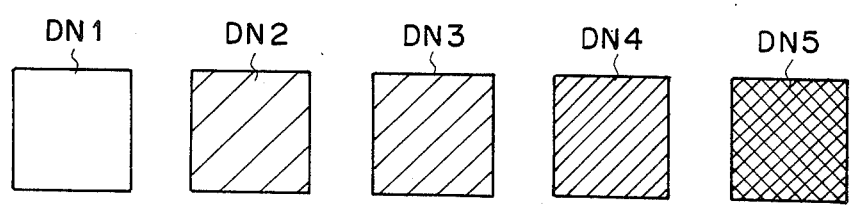
FIG. 5A is an illustration of several colors of an image on a paper.

Initially when a user operates a start switch, an on signal is supplied to CPU 31 (step S20). CPU 31 then controls and drives the DC motor 14 in accordance with a signal from the light receiving element 25 to move the read head 19 to a reading start position on the paper (step S21). CPU 31 then initializes the select data n which selects one of the drive circuits C1 to C16 to 1 (step S22). CPU 31 then determines if the selected data n is an odd number (step S23). Since the select data n is equal to 1, CPU 31 reads the select data n=1 from ROM 32, and outputs it to the demultiplexer 34 (step S24). CPU 31 then reads the established emission data w(1) from RAM 33 and outputs it to the converter 35 (step S25). The converter 35 then outputs an analog signal having a magnitude which corresponds to the established emission data w(1), and the light receiving element P1 produces a signal having a given output value as mentioned previously. If the point D1 associated with the light receiving element P1 is located in a white area DN1 on the paper as shown in FIG. 5A, the output value corresponding to the established emission data w(1) exceeds the reference value Vth, as indicated in a graph (DN1) of FIG. 6. Accordingly, the comparator K1 outputs a high level signal SG which is fed to CPU 31. CPU 31 then stores the signal SG in RAM 33 as identification data H11 which identifies the black or white color of the point D1 (step S26). In the present example, the identification data H11 is a signal representing the white color in the white area DN1 (see FIG. 5B).

Figure 5B:
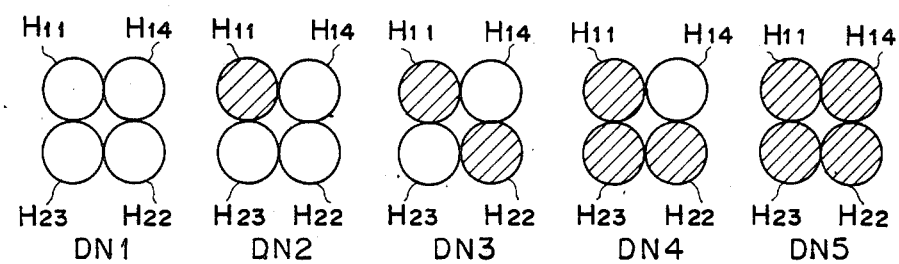
FIG. 5B is an illustration of a dither matrix which is formed on the basis of identification data.
Figure 6:
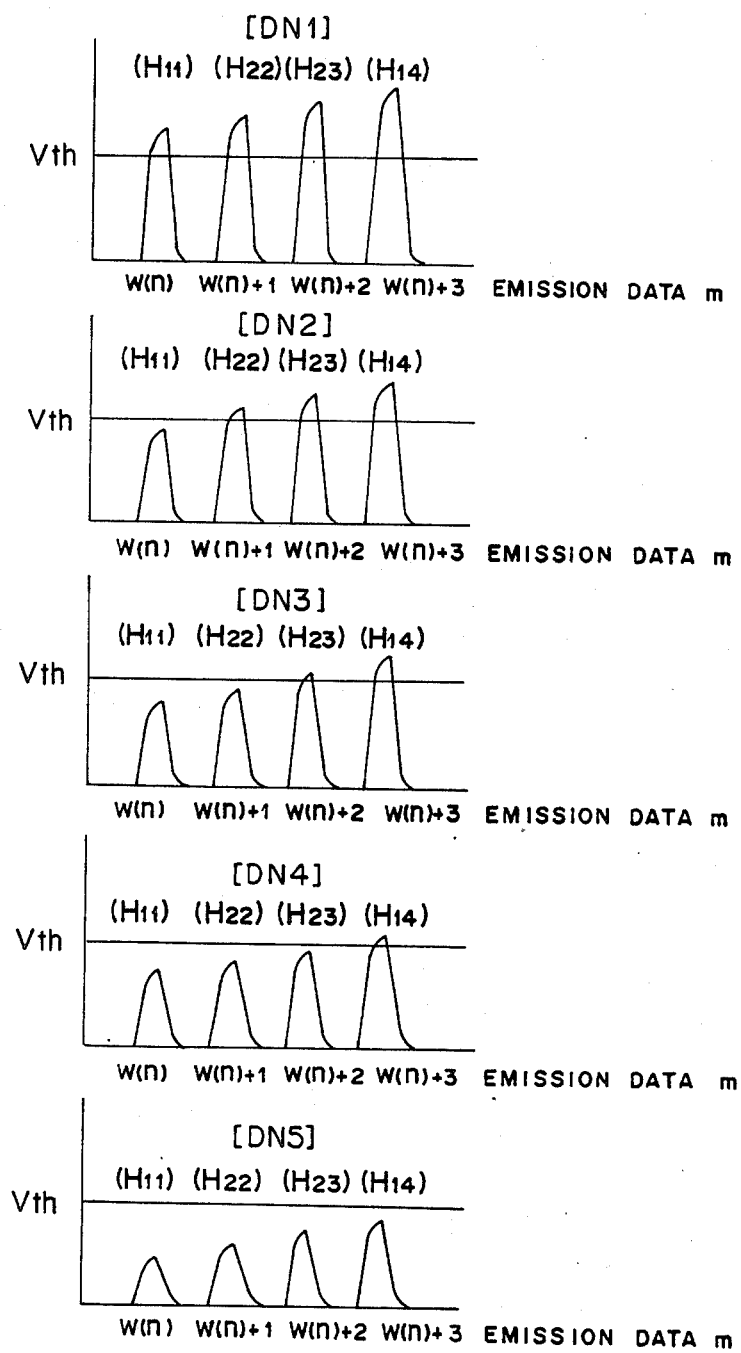
FIG. 6 graphically illustrates a series of signals which may be input to a comparator.

If the point D1 is located in a black area DN5 on the paper as shown in FIG. 5A, the output value corresponding to the established emission data w(1) does not exceed the reference value Vth, as indicated in a graph designated (DN5) of FIG. 6. Accordingly, the identification data H11 for the black area DN5 will be a signal representing the black color (see FIG. 5B).

When the point D1 is located in an intermediate color area DN3 which is between the white area DN1 and the black area DN5 on the paper as shown in FIG. 5A, the output value corresponding to the emission data w(1) does not exceed the reference value Vth, as indicated in a graph designated (DN3) of FIG. 6. Accordingly, the identification data H11 for the intermediate color area DN3 will be a signal indicating the black color (see FIG. 5B).

When the point D1 is located in an intermediate color area DN2 which is between the white area DN1 and the intermediate color area DN3 on the paper as shown in FIG. 5A, the output value corresponding to the emission data w(1) does not exceed the reference value Vth, as indicated in a graph designated (DN2) of FIG. 6. Thus, the identification data H11 for the intermediate color area DN2 will be a signal indicating black color (see FIG. 5B).

When the point D1 is located in an intermediate color area DN4 which is between the black area DN5 and the intermediate color area DN3 on the paper as indicated in FIG. 5A, the output value corresponding to the established emission data w(1) does not exceed the reference value Vth, as indicated in a graph designated (DN4) of FIG. 6. Thus the identification data H11 for the intermediate color area DN4 will be a signal indicating the black color (see FIG. 5B).

CPU 31 determines if the select data n is equal to 16 (step S30). If the select data n is not equal to 16, CPU 31 increments the select data n to (n+1) which is equal 2 (step S31). CPU 31 determines if the select data n=2 is an odd number (step S23). In the present instance, the select data n=2 is not an odd number, and hence CPU 31 reads the select data n=2 which selects from the drive circuits C1 to C16 from ROM 32, and outputs it to the demultiplexer 34 (step S27). CPU 31 then reads the established emission data w(2)+2 which is stored in RAM 33, and outputs it to the converter 35 (step S28). The converter 35 then outputs an analog signal having a magnitude which corresponds to the established emission data w(2)+2. The light receiving element P2 produces a signal having a given output value, as mentioned previously. If the point D2 associated with the light receiving element P2 is located in the white area DN1 on the paper as indicated in FIG. 5A, the output value corresponding to the established emission data w(2)+2 exceeds the reference value Vth, as indicated in the graph (DN1) of FIG. 6. Hence, the comparator K2 outputs a high level signal SG, which is fed to CPU 31. CPU 31 stores the signal SG in RAM 33 as identification data H23 which identifies the black or white color of the point D2 (step S29). Thus, the identification data H23 for the white area DN1 will be a signal indicating the white color (see FIG. 5B).

When the point D2 is located in the black area DN5 on the paper as shown in FIG. 5A, the output value corresponding to the established emission data w(2)+2 does not exceed the reference value Vth, as indicated in the graph (DN5) of FIG. 6. Accordingly, the identification data H23 for the black area DN5 will be a signal indicating the black color (see FIG. 5B).

When the point D2 is located in the intermediate color area DN3 which is between the white area DN1 and the black area DN5 on the paper as shown in FIG. 5A, the output value corresponding to the established emission data w(2)+2 exceeds the reference value Vth, as indicated by the graph (DN3) of FIG. 6. Accordingly, the identification data H23 for the intermediate color area DN3 will be a signal indicating the white color(see FIG. 5B).

When the point D2 is located in the intermediate color area DN5 which is between the white area DN1 and the intermediate color area DN3 on the paper, as shown in FIG. 5A, the output value corresponding to the established emission data w(2)+2 exceeds the reference value Vth as shown by the graph (DN2) of FIG. 6. Thus, the identification data H23 for the intermediate color area DN2 will be a signal indicating the white color (see FIG. 5B).

When the point D2 is located in the intermediate color area DN4 which is between the black area DN5 and the intermediate color area DN3 on the paper as shown in FIG. 5A, the output value corresponding to the established emission data w(2)+2 does not exceed the reference value Vth, as indicated by the graph (DN4) of FIG. 6. Accordingly, the identification data H23 for the intermediate color area DN4 will be a signal indicating the black color (see FIG. 5B).

Figure 7:
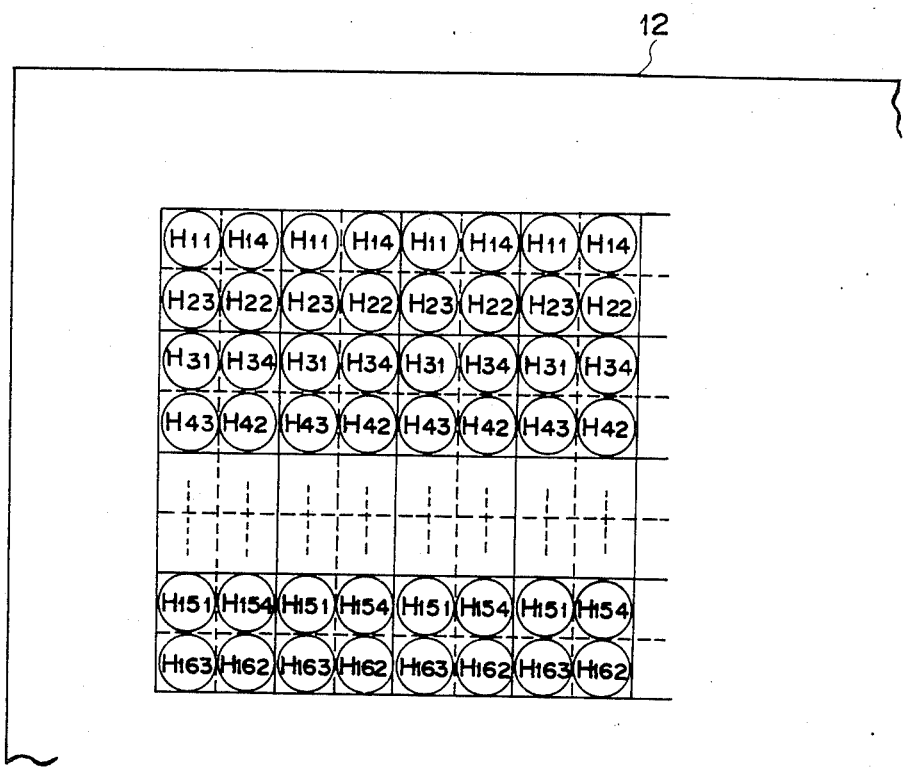
FIG. 7 is an illustration of a dither matrix formed on the paper.

CPU 31 then checks if the select data n is equal to 16 (step S30). If the select data n is not equal to 16, CPU 31 repeats the steps S23 to S29. In this manner, CPU 31 obtains identification signals H11, H23, H31, H43 . . . H15 1, H16 3 on the paper as shown in FIG. 7, and which are stored in RAM 33. It should be understood that the first postfix to the identification signal H represents the number of the point D while "1" in the second postfix corresponds to the established emission data w(n) and "3" in the second postfix corresponds to the established emission data w(n)+2.

CPU 31 controls the drive applied to the DC motor 14 in accordance with the signal received from the light receiving element 25 in order to move the read head 19 on the paper by an amount corresponding to one pitch of the reader resolution (step S32). CPU 31 then initializes the select data n to 1 (step S33). CPU 31 then determines if the select data n is an odd number (step S34).

Since the select data n is equal to 1, CPU 31 reads select data n=1 from ROM 32, and outputs it to the demultiplexer 34 (step S35). CPU 31 reads the established emission data w(1)+3 which is stored in RAM 33, and outputs it to the converter 35 (step S36). The converter 35 then outputs an analog signal having a magnitude which corresponds to the established emission data w(1)+3, and the light receiving element P1 produces a signal having a given output value as mentioned previously. When the point D1 associated with the light receiving element P1 is located in the white area DN1 on the paper as shown in FIG. 5A, the output value corresponding to the established emission data w(1)+3 exceeds the reference value Vth as indicated by the graph (DN1) of FIG. 6. Hence the comparator K1 output a high level signal SG, which is fed to CPU 31. CPU 31 then stores the signal SG in RAM 33 as identification data H14 which identifies the black or white color of the point D1 (step S37). The identification data H14 for the white area DN1 will be a signal indicating the white color (see FIG. 5B).

When the point D1 is located in the black area DN5 on the paper as shown in FIG. 5A, the output value corresponding to the established emission data w(1)+3 does not exceed the reference value Vth as indicated by the graph (DN5) of FIG. 6. Thus, the identification data H14 for the black area DN5 will be a signal indicating the black color (see FIG. 5B). When the point D1 is located in the intermediate color area DN3 which is between the white area DN1 and the black area DN5 on the paper as shown in FIG. 5A, the output value corresponding to the established emission data w(1)+3 exceeds the reference value Vth as indicated by the graph (DN3) of FIG. 6. Thus, the identification data H14 for the intermediate color area DN3 will be a signal indicating the white color (see FIG. 5B).

When the point D1 is located in the intermediate color area DN2 which is between the white area DN1 and the intermediate color area DN3 on the paper as shown in FIG. 5A, the output value corresponding to the established emission data w(1)+3 exceeds the reference value Vth as indicated by the graph (DN2) of FIG. 6. Thus, the identification data H14 for the intermediate color area DN2 will be a signal indicating the white (see FIG. 5B).

When the point D1 is located in the intermediate color area DN4 which is between the black area DN5 and the intermediate color area DN3 on the paper as shown in FIG. 5A, the output value corresponding to the established emission data w(1)+3 exceeds the reference value Vth as indicated by the graph (DN4) of FIG. 6. Thus, the identification data H14 for the intermediate color area DN4 will be a signal indicating the white color (see FIG. 5B).

CPU 31 then checks if the select data n is equal to 16 (step S41). If it is not, CPU 31 then increments the select data n to 2 (step S42). CPU 31 then determines if the select data n=2 is an odd number (step S34). Since the select data n=2 is not an odd number, CPU 31 reads the select data n=2 which selects from the drive circuits C1 to C16, from ROM 32, and outputs it to the demultiplexer 34 (step S38). CPU 31 reads the established emission data w(2)+1 which is stored in RAM 33, and outputs it to the converter 35 (step S39). The converter 35 then outputs an analog signal having a magnitude which corresponds to the established emission data w(2)+1, and the light receiving element P2 produces a signal having a given output value, as mentioned previously. When the point D2 associated with the light receiving element P2 is located in the white area DN1 on the paper as indicated in FIG. 5A, the output value corresponding to the established emission data w(2)+1 exceeds the reference value Vth, as indicated by the graph (DN1) of FIG. 6. Thus, the comparator K2 outputs a high level signal SG, which is fed to CPU 31. CPU 31 then stores the signal SG in RAM 33 as identification data H22 which identifies the black or white color of the point D2 (step S40). The identification data H22 for the white area DN1 will be a signal indicating the white color (see FIG. 5B).

When the point D2 is located in the black area (DN5) on the paper as indicated in FIG. 5A, the output value corresponding to the established emission data w(2)+1 does not exceed the reference value Vth, as indicated by the graph (DN5) of FIG. 6. Thus, the identification data H22 for the black area DN5 will be a signal indicating the black color (see FIG. 5B). When the point D2 is located in the intermediate color area DN3 which is between the white area DN1 and the black area DN5 on the paper as indicated in FIG. 5A, the output value corresponding to the established emission data w(2)+1 does not exceed the reference value Vth, as indicated by the graph (DN3) of FIG. 6. Thus, the identification data H12 for the intermediate color area DN3 will be a signal indicating the black color (see FIG. 5B).

When the point D2 is located in the intermediate color DN2 which is between the white area DN1 and the intermediate color area DN3 on the paper as shown in FIG. 5A, the output value corresponding to the established emission data w(2)+1 exceeds the reference value Vth, as indicated by the graph (DN2) of FIG. 6. Thus, the identification data H22 for the intermediate color area DN2 will be a signal indicating the white color (see FIG. 5B).

When the point D2 is located in the intermediate color area DN4 which is between the black area DN5 and the intermediate color area DN3 on the paper as indicated in FIG. 5A, the output value corresponding to the established emission data w(2)+1 does not exceed the reference value Vth, as indicated by the graph (DN4) of FIG. 6. Thus, the identification data H22 for the intermediate color area DN4 will be a signal indicating the black color (see FIG. 5B).

CPU 31 checks if the select data n is equal to 16 (step S41). If the select data is not equal to 16, the select data n is incremented by one (step S42). CPU 31 then repeats the steps S34 to S42, thereby storing identification signals H14, H22, H34, H42, ... H15 4, H16 2 for the first to the sixteenth points D1 to D16 on the paper shown in FIG. 7 in RAM 33. It should be understood that "4" appearing in the second postfix to the identification data H corresponds to the established emission data w(n)+3 and "2" in the second postfix corresponds to the established emission data w(n)+1.

CPU 31 constructs a dither matrix, as defined within a solid line frame shown in FIG. 7, using the identification data Hn1, Hn4, H(n+1)3 and H(n+1)2 which are stored in RAM 33 (step S43).

CPU 31 then determines if the read head 19 has completed reading the image on the paper (step S44).

If CPU 31 determines that the read head 19 has not completed reading the image on the paper, it moves the read head 19 by one pitch of the reader resolution, by driving the DC motor in accordance with the signal from the light receiving element 25 (step S45). CPU 31 then repeats the operations of the steps of S22 to S45 until the read head 19 completes reading the image on the paper.

When CPU 31 determines that the read head 19 has completed reading the image on the paper, CPU 31 exits from these flow charts.

In the present embodiment, the optical reader operates to read the areas on the paper, those extending between the white area DN1 to the black area DN5, as shown in FIG. 5A, as a dither matrix comprising identification data H11, H14, H23 and H22 as shown in FIG. 5B, by controlling the light emitting elements L1 to L16 to illuminate the reading points D1 to D16 with different amount of light which corresponds to a plurality of halftones established by the adjust means 31a. CPU 31 then constructs a plurality of dither matrixes as shown in FIG. 7 on the paper. In this manner, the optical reader is capable of reading an image on the paper in multiple halftones.

In the described embodiment, the adjust means 31a has established a single reference value Vth which is used to determine the amounts of light emitted by the first to the sixteenth light emitting elements. However, in an alternative embodiment, a plurality of predetermined reference values may be used to establish the light emission from the first to the sixteenth light emitting elements. Obviously, the use of the plurality of reference values eliminates the need to compensate for any non-uniformity in the light emission among the light emitting elements L1 to L16. However, the use of a single reference value provides a more inexpensive arrangement than when using the plurality of reference values.

From the foregoing, it will be appreciated that the optical reader of the invention enables an image on the paper to be read in multiple halftones while eliminating the need to compensate for a reference value which has been required in the conventional optical reader.

What is claimed is:

1. An optical reader comprising
   a plurality of light emitting elements (L1 to L16) which illuminate a plurality of reading points (D1 to D16) on a paper through a plurality of optical fibers (T1 to T16);
   a plurality of light receiving elements (P1 to P16) for receiving reflected light from the plurality of reading points (D1 to D16) through a plurality of optical fibers (R1 to R16);
   read means (K1 to K16) for determining if output values from the plurality of light receiving elements (P1 to P16) have reached a given reference value (Vth);
   adjust means (31a) for establishing the amount of light emitted by the respective light emitting elements in a plurality of different halftones;
   and control means for controlling the plurality of light emitting elements (L1 to L16) so as to illuminate the plurality of reading points (D1 to D16) with different amounts of light which correspond to the plurality of halftones established.

2. An optical reader according to claim 1 in which the adjust means (31a) establishes the plurality of half-tones on the basis of the reference value (Vth).

3. An optical reader according to claim 1 in which the control means (31b) operates to construct a dither matrix from the plurality of reading points (D1 to D16).

4. An optical reader according to claim 1 in which the single reference value is used.

5. An optical reader according to claim 1, further comprising a memory which stores detection outputs from the read means for each of the plurality of reading points.

* * * * *